United States Patent
Tawara et al.

[11] Patent Number: 5,959,283
[45] Date of Patent: Sep. 28, 1999

[54] OPTICAL PATTERN READING APPARATUS WITH MOVABLE OPTICAL UNIT

[75] Inventors: Takao Tawara; Toshiei Kera, both of Saitama-ken, Japan

[73] Assignee: Opticon, Inc., Orangeburg, N.Y.

[21] Appl. No.: 08/802,846

[22] Filed: Feb. 19, 1997

[51] Int. Cl.$^6$ .................................................. G06K 7/10
[52] U.S. Cl. .................................. 235/462.01; 235/472
[58] Field of Search ................................. 235/462.01, 472

[56] References Cited

U.S. PATENT DOCUMENTS

| | | | |
|---|---|---|---|
| 4,578,571 | 3/1986 | Williams | 235/472 |
| 4,805,175 | 2/1989 | Knowles | 372/24 |
| 4,893,196 | 1/1990 | Koshiyouji et al. | 358/474 |
| 5,144,120 | 9/1992 | Krichever et al. | 235/472 |
| 5,191,197 | 3/1993 | Metlitsky et al. | 235/472 |
| 5,202,784 | 4/1993 | Reddersen | 359/196 |
| 5,206,492 | 4/1993 | Shepard et al. | 235/472 |
| 5,254,844 | 10/1993 | Krichever et al. | 235/462 |
| 5,282,053 | 1/1994 | Robideau | 358/406 |
| 5,354,977 | 10/1994 | Roustaei | 235/472 |
| 5,367,379 | 11/1994 | Makino | 356/446 |
| 5,371,348 | 12/1994 | Kumar et al. | 235/472 |
| 5,386,106 | 1/1995 | Kumar | 235/462 |
| 5,455,412 | 10/1995 | Imagawa et al. | 250/208.1 |
| 5,477,044 | 12/1995 | Aragon | 235/472 |
| 5,521,367 | 5/1996 | Bard et al. | 235/462 |
| 5,572,008 | 11/1996 | Sakai et al. | 235/467 |
| 5,602,379 | 2/1997 | Uchimura et al. | 235/472 |

*Primary Examiner*—Thien Minh Le
*Assistant Examiner*—Daniel Sherr
*Attorney, Agent, or Firm*—Henry Schanzer

[57] ABSTRACT

An optical reading apparatus for moving a mirror in a back and forth motion such that the mirror scans the light reflected from an optical pattern and sequentially projects narrow segments of the reflected image onto a linear image sensor. Moving the mirror includes means for mounting the mirror within a movable case which is mounted on a shaft to selectively cause the case to go back and forth in a seesaw-like fashion. As the case goes back and forth, it causes the mirror to sweep or scan across the reflected image of an optical pattern. As the mirror sweeps across the reflected image of the optical pattern it sequentially projects different segments of the optical pattern onto the linear image sensor until the entire optical pattern is projected onto the linear image sensor. The linear image sensor is operable at a high rate of speed and is sufficiently sensitive that it can sense numerous (e.g., 50, or more) segments of the reflected image during one sweep of the mirror. The image sensor may be a solid state device having a large number of photosensitive elements formed along a row. In a preferred embodiment, the light for illuminating the optical pattern to be read is also mounted within the movable case so as to move with the case, whereby projected light is swept across the optical pattern as it is being read, with greater illumination being provided for those segments whose reflected light is being projected on the image sensor.

17 Claims, 3 Drawing Sheets

OPTICAL PATTERN READING APPARATUS WITH MOVABLE OPTICAL UNIT

BACKGROUND OF THE INVENTION

This invention relates to means for reading an optical pattern containing one-dimensional or multi-dimensional characters.

Known optical reading equipment is used to read optical patterns by projecting a light onto the optical pattern. A light image reflected from the optical pattern is then projected onto an electronic scan type sensor, such as a photodetector, which converts the reflected light image into an electronic analog signal. The analog signal is then processed to read and recognize the optical pattern information.

A common optical pattern to be read is a barcode, comprised, typically, of a row of parallel stripes which may be, for example, black and white stripes of different shapes and with different spacing. However, use of optical reading apparatus is expanding in many fields, including, for example, various fields such as factory-automation, distribution channel, service system, etc. Furthermore, the volume of information to be recorded, read and processed is ever increasing. The increase in the information makes it difficult, if not impossible, to include the needed information in one row of a barcode. Therefore, it is now desirable to be able to read multi-row barcodes, 2-dimensional barcodes, letters, characters, and other high density codes.

Multi-dimensional information codes and symbols may be read by a scanner such as a TV camera system illustrated in FIG. 1. The TV camera system scanner in FIG. 1 includes a TV camera (21), an image processor (22) and a TV monitor (23). The image processor (22) is connected to a host computer (not shown) via a communication RS-232C line. In this kind of system an information label (24) is set to face the TV camera (21) and may be photographed by the TV camera (21) under normal room light illumination, and the photographed image is processed and converted by the image processor (22) and transmitted to the host computer. On the other hand, the data of the photographed image may also be displayed on a TV monitor (23) via a connecting cable.

Some problems associated with the prior art include the following: First, the TV camera (21), the image processor (22) and the TV monitor (23), etc. are expensive pieces of equipment. Second, a certain length of time is needed to prepare and focus the TV camera (21) to enable it to comply with the room illumination brightness. Third, a 2-dimensional area sensor, that converts the image of the TV camera (21) photoelectrically, has a limited effective number of pixels in the horizontal and vertical directions (e.g., 576 H×485 V). This limits the resolution capacity of the reading. In this respect the resolution capacity is meant for a minimum line width of a readable information pattern. Fourth, the reading apparatus, repeating the rotation of a mirror in such a function as stop-rotation-stop, is slower in its reading speed and its improvement is fundamentally difficult.

It is an object of the present invention to overcome problems associated with the prior art discussed above.

It is another object of the invention to use a line image sensor and to effectuate a high speed, two-dimensional, reading of an optical pattern by cyclically varying and moving the angle and/or the position of a movable reflecting mirror.

It is still another object of the invention to enable the accurate reading in a very short time of a "one-row" barcode as well as multi-row barcodes, 2-dimensional barcodes, letters and characters.

It is another object of the invention to enable the easy and accurate position setting and support of the reading apparatus and the aiming of the apparatus toward an object to be read.

It is another object of the invention to make use of a line image sensor having a large number of pixels arranged in a row to enable the reading of an optical pattern with greater resolution than can be done with conventional reading method by a TV camera.

Another object of the invention is to achieve fast reading of an optical pattern by the repeated back and forth movement and/or vibration of a movable reflecting mirror without a move-and-stop function.

Another object of the invention is to provide optical reading apparatus which is smaller in size, lighter in weight and less costly to manufacture than the prior art apparatus and which includes simplified and energy-saving means for providing swinging and/or vibratory motion.

SUMMARY OF THE INVENTION

An optical reading apparatus embodying the invention includes a housing with a rotatable optical unit mounted within the housing. The rotatable optical unit is mounted so it can rotate back and forth in a see-saw like fashion. The rotatable optical unit includes a light source, a reflecting mirror and a linear one-dimensional image sensor. The light source is used for illuminating an optical pattern located externally to the housing. The mirror means is arranged to receive light reflected from an optical pattern and to sequentially scan, one segment at a time, the entire area of the optical pattern. As the movable mirror means scans or sweeps across the optical pattern image it sequentially projects different narrow rectangular portions of the optical pattern area onto the linear image sensor, whereby the entire optical pattern image is projected one segment at a time onto the image sensor.

In a particular embodiment of the invention, the image sensor is a high density solid state charge coupled device (CCD) having a large number of pixels formed along one row.

In a particular embodiment of the invention, the mirror is mounted within a movable case mounted on a shaft to selectively cause the movable case and the mirror to go back and forth in a seesaw-like fashion. As the mirror goes back and forth, it sweeps or scans across the reflected image of the optical pattern sequentially projecting a narrow rectangular portion of the reflected optical pattern onto the linear image sensor.

In a particular embodiment, the light source for illuminating the optical pattern is also mounted within the movable case, with the light source arranged to illuminate the area of the optical pattern about to be read.

Driving means may be coupled to the shaft to cause it to swing back and forth or to rotate.

As to light reflected from the optical pattern and projected onto the movable mirror, an optical assembly may be used to collect the light reflected from the movable mirror and to project it via the optical assembly onto the linear image sensor.

In a particular embodiment, the light source, the mirror, the optical assembly and the image sensor are all mounted within the movable case and go back and forth together.

The output signals of the linear image sensor may be applied to signal processing circuitry which is, in turn, connected to a memory and decoding circuitry.

It should be noted that imparting a cyclical bending vibratory motion to the arm causes a reflecting mirror connected thereto to cyclically change angle and position, which in turn produces a scan pattern of parallel lines of approximately equal spacing from the optical pattern being read and which parallel lines are then projected onto the linear image sensor.

The light source illuminating the optical pattern is located outside of the reflected light path so as not to interfere with the light reflected from the optical pattern which is to be projected onto the linear image sensor.

BRIEF DESCRIPTION OF THE DRAWINGS

In the accompanying drawing like reference characters denote like components.

DETAILED DESCRIPTION OF THE INVENTION

Figure 2A:
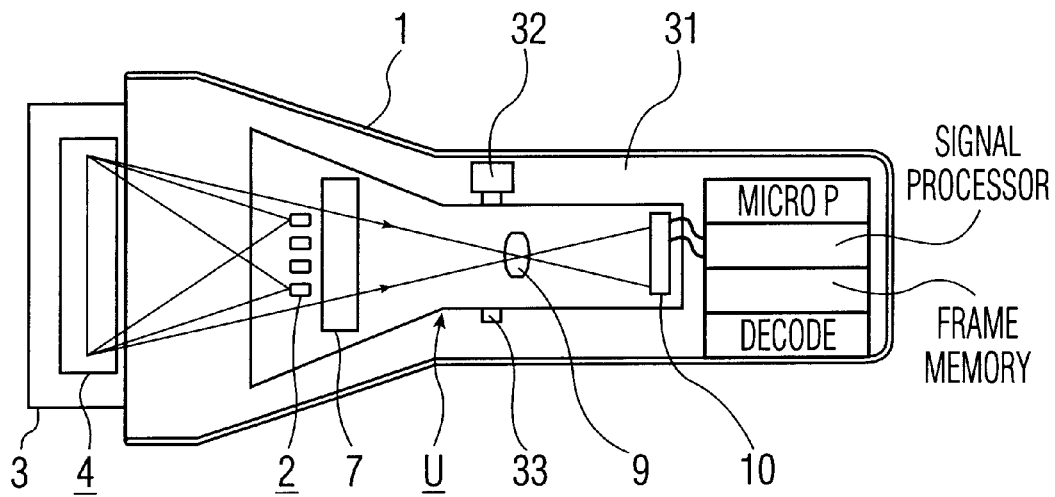
FIG. 2A is a cut away top view of an optical reader embodying the invention.
Figure 2B:
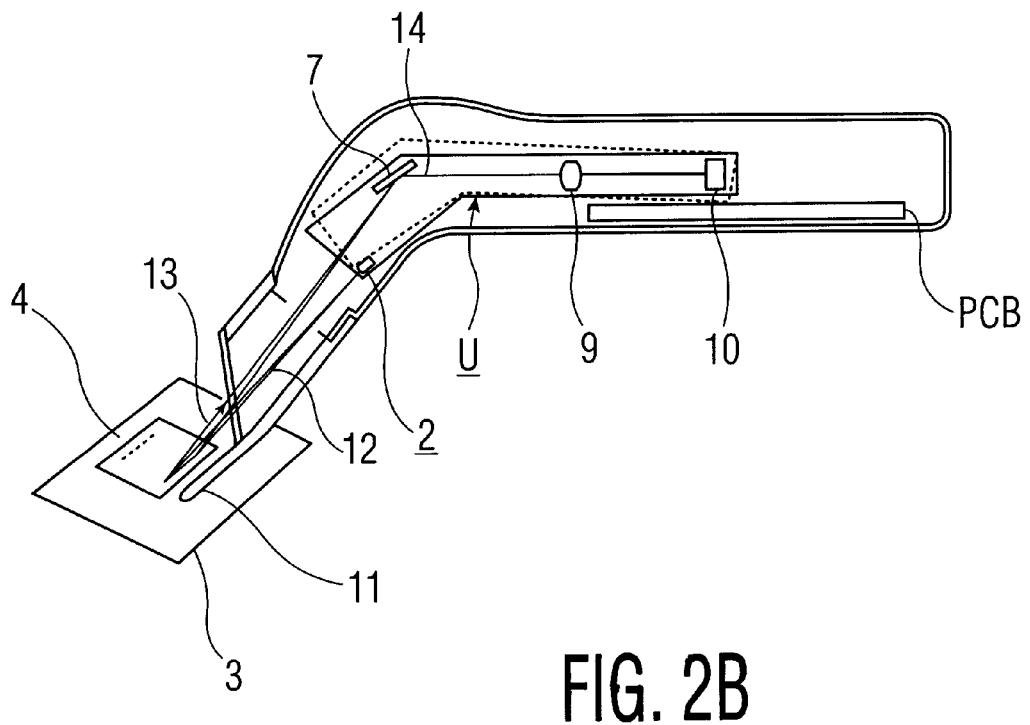
FIG. 2B is a cross sectional view of the optical reader of FIG. 2A.

Referring to FIGS. 2(a) and 2(b), there is shown a housing 1, which may easily be held in one hand, in which is mounted a movable optical unit case 31 in accordance with the invention. The embodiment of FIGS. 2(a) and 2(b) includes a housing 1, which is designed to be stationary during a read cycle, a movable (or rotatable) optical unit 31 which rotates back and forth by means of a movable optical unit drive shaft 33, an optical unit drive means 32 connected to shaft 33 for causing it to go back and forth, a light projection means 2 mounted within unit case 31, a movable reflecting mirror 7 mounted within unit case 31, a movable light condensing optic assembly 9 mounted within the unit case 31, a one dimensional electronic scan type image sensor (e.g., a CCD) also mounted within the unit case 31. A position guide 11 is connected to the housing. A printed circuit board PCB is mounted on the bottom surface of the housing. The optical reader also includes a micro-computer, signal processing circuitry connected to the output of the image sensor, a memory circuit (e.g., a large frame memory) connected to the micro computer and to the signal processing circuitry and decoder circuitry connected to the memory, the signal processor and the microcomputer. FIGS. 2(a) and 2(b) also show an object medium 3 containing an optical pattern 4 which is to be read by the reader, light 12 projected by the LEDs, the light 13 reflected by the optical pattern and the re-reflected 14.

As illustrated in FIGS. 2(a) and 2(b), the housing 1 has a horizontal rear section which is generally rectangular and tubular in shape and a front section which extends downward from the horizontal at an obtuse angle relative to the horizontal. The front section is generally wider than the rear section and flares out (widens) beginning at the bend defining the two sections. There is room inside the housing for mounting the unit case 31 and other components needed to operate the optical reader. In the vertical cross sectional view of FIG. 2(b), the housing 1 bends downward in the middle area. The front top of the housing 1 has a light entrance-exit port to allow the projection of light and the reflection of light to pass through. The entrance exit port may be a plate made of a transparent light penetrating material.

Figure 1:
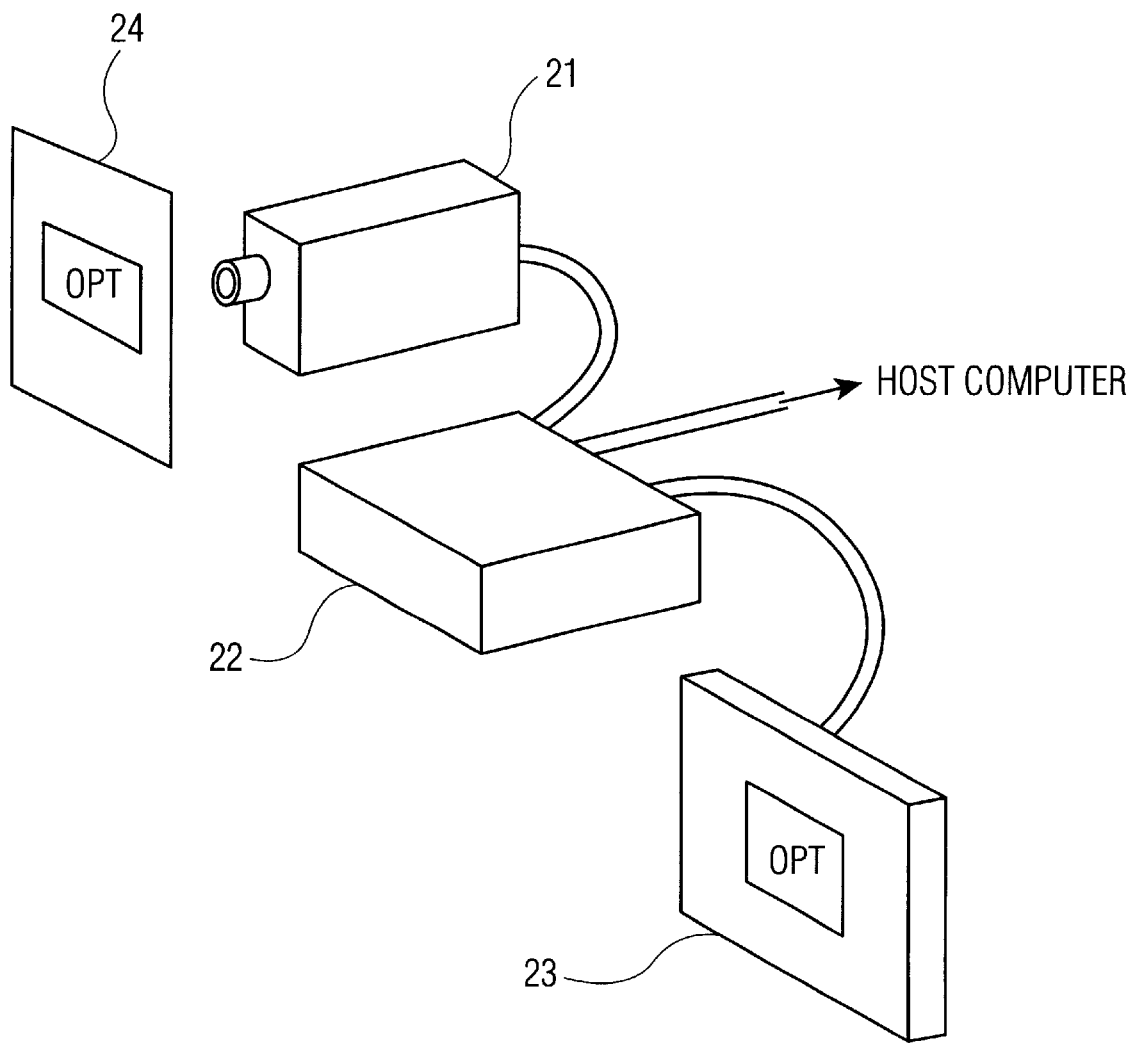
FIG. 1 is a diagram of a prior art system.

The housing 1 includes a guide 11 to determine the location of the optical pattern to be read. Guide 11 may be in the shape of a plane or 2-tine fork. It is arranged at the top end of the housing 1 and extends slantingly downward as illustrated in FIGS. 1 and 6. By placing the top end of guide 11 in a preferred position on the medium to be read 3 and holding it on the medium as illustrated in FIG. 1, the housing 1 may be held accurately and securely at the correct desired position during an entire read cycle.

As illustrated in FIGS. 2(a) and 2(b), movable optical unit case 31 fits within the housing and has a generally similar, though smaller, shape. Unit case 31 has a rear section which is horizontal and a front section which, beginning at a bend, slants in a downward direction away from the horizontal. The front section of unit case 31 widens and slants down away from the bend while the rear portion is generally tubular rectangular and is hollow inside. The front top of the movable optic unit case 31 has a light entrance-exit port to allow light to be projected externally and for light reflected from outside to pass through into the case.

As illustrated in FIGS. 2(a) and 2(b), the light projection means 2 includes a plurality of light sources such as light emitting diodes (LEDs) arranged almost linearly (i.e., along the same row). In optical readers embodying the invention the LEDs may be pulsed to enhance the readability of the optical pattern. The light sources are positioned so as not to interfere with the light reflected from the optical pattern. In this embodiment the light sources are placed at the inside plane of the bottom wall of the movable optic unit 31.

The movable reflecting mirror 7 is mounted inside the movable unit case 31 near the bending area and is arranged to slant slightly downward.

The movable light condensing optic assembly 9 is mounted inside the movable unit case 31 so as to receive the reflected light from the movable reflecting mirror 7. The optic assembly 9 functions to image the re-reflected light from the movable reflecting mirror 7 on a predetermined plane deep inside the movable unit case 31. The movable light condensing optic assembly 9 may be formed with one lens and one aperture or two lenses with an aperture located between the 2 lenses.

The line image sensor 10 is amounted deep inside the movable unit case 31.

As may be seen from the Figures, the reflecting mirror 7, the light condensing optic assembly 9 and the line image sensor 10 are, positioned to be on one straight line. The line image sensor 10 can convert a strength distribution of transverse line direction of a light image imaged on a linear light condensing plane to an electric strength signal on the time axis photo-electrically in an instant.

The image sensor 10 is an electronic scan type one-dimensional image sensor array, also referred to herein as a "linear" array (as opposed to a "matrix" array) which is arranged to receive the re-reflected light projected via the condensing optic system 9. The linear (one-dimensional) image sensor 10 may be a charge coupled device (CCD) consisting of a large number of pixels; where each pixel is a photo sensing element. The number of pixels in a presently available linear image sensor may be, typically, 2,048. However, linear image sensors with 5,000 or more pixels are being made and will be available in the near future. Large linear arrays will be available for use well before any matrix arrays of like density (along any row) are available and at a much lower price. It is therefore important to be able to use linear sensors to perform a linear or a multi-dimensional sensing. The one-dimensional CCD functions to receive photoelectric signals and to convert these photo signals to electric signals which can be scanned and read out. The light image (a light input signal) reflected from an optical pattern onto the linear light condensing plane of the one-dimensional CCD array may be sampled in a variety of known arrangements.

Each sampled value of the reflected image on each pixel is converted to a signal electric charge and stored in an appropriate location and after an electric charging time it is transmitted to a CCD register by a photogate, all pixels are read-out in parallel, at the same time. The signal electric charges developed in a row of the CCD register are converted to a corresponding row of the sampled value on the time axis (a value of voltage or current), i.e. an electric analog signal, A one-dimensional linear CCD array having pixels with a width ranging between approximately 7 microns and 14 microns is currently obtainable. If the width of each pixel is assumed to be 14 microns, the length of a line image sensor may be approximately 28 mm (i.e., 14 microns×2,048 pixels). The resolution capacity obtainable with a 2048 linear array is approximately 4 times the resolution obtainable with an area matrix sensor of a TV camera of the type discussed above. The height of the pixels in the one-dimensional array may be 200 microns. But, to read multi-dimensional codes, words and characters, etc., it is preferable to reduce the height in order to enhance the resolution capacity in the perpendicular direction.

In the embodiment of FIGS. 2(a) and 2(b) it is preferable to use pixels of approximately 14 microns in height (although longer or shorter pixel elements are acceptable). This permits the use of a smaller sized lens for the optic assembly 9 which is designed to project the re-reflected light 14 to extend across a width of 28 mm. The time to perform a scan of a presently available single line image sensor of 2048 pixels is approximately 100 microseconds. But, it is expected that linear images scanners which can be read out in less than 50 microseconds will soon be available. Although the invention is illustrated using CCD sensors, MOS type imagers may be used instead for the electric scan type line image sensor (10). Thus the preferred image sensor includes a large number of pixel elements arranged in a row.

The driving means 32 is comprised of an electric to mechanical conversion system such as a galvanic motor, or any like motor, in which a drive shaft, not illustrated, performs a swing driving by an electrically charged load. The drive shaft is connected to the optical unit revolution shaft 33.

A resilient material that can be flexibly pressured and extended such as a pressure-pull coil spring is located between the movable unit case 31 and the bottom wall of the housing 1, and/or between the movable optic unit 31 and the top wall of the housing 1 in order to cushion the ends of the swing movement of the movable optic unit (U and 31). The position on the movable optic unit 31 where the resilient material is arranged must be considerably away in front or rear from the optical unit revolving shaft 33. Thus, the movable optical unit (U) may cause a cyclical back and forth movement of the optical unit revolving shaft 33.

In FIGS. 2(a) and 2(b) electronic and control circuitry may be mounted on the printed circuit board (PCB) which is mounted on the inside bottom wall of the housing (1). Whole, or part, of the signal processing circuitry may be mounted on the printed circuit board (PCB) and the input terminal of which is connected to the output terminal(s) of the line image sensor 10.

The method of the electrical connection may be made by a warping lead-line or a magnetic coupling or a static coupling, etc.

A signal processing circuit is connected to the output terminal of the line image sensor 10, and a memory and a decode circuit are connected to the signal processing circuit. The signal processing circuit includes logarithmic amplifying circuitry as well as linear amplifying circuitry and other circuits, such as slice circuitry, to perform signal processing functions. The logarithmic amplifying circuitry make use of logarithmic characteristics to expand an input signal level if it is smaller, and to compress it if it is larger. Slice circuitry located within the signal processing circuit processes an input electric analog signal such as a barcode signal and, for example, converts the electric analog signal of a black pattern signal to a logic-one ("1") level and converts the electric analog signal of a white pattern to a logic-zero ("0") level, or vice versa. The output of the signal processing circuit is transmitted to memory circuitry.

The memory circuit may include a frame memory array having "m"-rows and "n"-columns or lines. The number "m" being determined by the number of scan lines, for instance 50, and the number "n" being determined by the number of pixels, for instance 2,048 of the image sensor 10. Where more than one bit is required to be stored for each pixel of information, the frame memory may be increased correspondingly.

The decode circuitry includes a micro-computer containing known algorithms to read/sense and recognize/extract one-row barcodes, two-dimensional codes, letters and characters. The decode circuitry may be mounted on the printed circuit board containing the signal processing and memory circuitry within the housing. Alternatively, it may be located partly, or entirely, outside the housing 1.

A part of the reflected light enters into the inside of the housing 1 and the movable optic unit 31 after passing through the light port of the housing 1, and is then projected onto the movable reflective mirror (7). The light reflected from the optical pattern is shown as the reflected light (13) in FIG. 2(b). The reflected light (13) is reflectively deflected onto a predetermined area of reflecting mirror (7) and then becomes the re-reflected light ray 14. The re-reflected light 14 is imaged on the linear light condensing plane of the movable line image sensor 10 through the light condensing optic assembly 9. Reflected light from any area, other than the linear area (the solid line) will not be projected onto the linear light condensing plane of the line image sensor 10, even though it may reach the movable reflective mirror 7.

The linear area (the solid line) crossing the lowest end of the optical pattern (4) cannot be observed as it is. However, if a plurality of a micro light sources are arranged on the light condensing plane of the line image sensor 10, the main part of the light emitted therefrom will pass through the light condensing optics 9 and the reflecting mirror 7 in the opposite directional path, and be projected onto the linear area (the solid line) and make a line of the light points, from which the lowest end of the linear area can be recognized. The light from said plurality of micro light sources would not be projected onto any area other than the area of the lowest end of the linear area as an aperture (g) is arranged inside the movable light condensing optics. It enables the visualization that the lowest movement position of the movable optical unit (U) corresponds to the lowest end of the linear area (the solid line) of the optical pattern (4).

The light image imaged on the linear light condensing plane of the movable line image sensor 10 will be photoelectrically converted to an electric analog signal. This signal is, for instance, provided to a logarithmic amplifier circuit. In accordance with its logarithm characteristics, the logarithmic amplifier circuit extends its amplitude when the provided electrical signal is of smaller amplitude and compresses it when it is not.

A slice circuit slices the provided electric analog signal and converts to a digitized signal. For instance, the amplitude of an analog signal by a black color pattern signal is converted to a "logic 1" level, and the amplitude of an analog signal by a white color pattern signal is converted to a "logic 0" level.

At the time the movable optical unit (U) is at the position shown with the dotted line, (hereinafter referred to as the utmost extent of the upper moving position or the 1st moving position), the projection means 2 crossing over the utmost end of the linear area of the optical pattern 4 is shown with the dotted line at the upper part on the optical pattern 4 as shown in FIG. 2(*b*). It, (hereinafter referred to as the 1st linear area) is projected by the main projected light and also by ambient (environmental) light at the same time.

The main projection light is reflectively deflected by the utmost end of the upper linear area. A part of the reflected area enters into the inside of the housing 1 and of the movable unit case 31 after passing through the light port of the housing 1, and is then projected onto a predetermined area of the reflecting mirror (7).

The reflected light is reflectively deflected at a predetermined area on the movable reflective mirror (7) and becomes a re-reflected light, This re-reflected light is imaged onto the linear light condensing plane of the line image sensor 10 after passing through the re-reflected light path illustrated in FIG. 1(*b*). Then, light reflected from the utmost upper end of the linear area (the dotted line) is projected onto the reflecting mirror 7, but not onto the linear light condensing plane of the line image sensor 10. This means that the utmost upper end of the moving position of the movable optical unit (U) corresponds to the utmost upper end of the linear area of the optical pattern (4).

The operation of line image sensor 10 when the movable optical unit (U) is at the dotted line as illustrated in FIG. 2(*b*), is the same as the operation when the movable unit (U) is at the solid line.

The reflected light is reflectively deflected at a predetermined area on the movable reflective mirror (7) and becomes a re-reflected light, This re-reflected light is imaged onto the linear light condensing plane of the line image sensor 10 after passing through the re-reflected light path illustrated in FIG. 2 (*b*). Then, light reflected from the utmost upper end of the linear area (the dotted line) is projected onto the reflecting mirror 7, but not onto the linear light condensing plane of the line image sensor 10. This means that the utmost upper end of the moving position of the movable optical unit (U) corresponds to the utmost upper end of the linear area of the optical pattern (4). The operation of line image sensor 10 when the movable optical unit (U) is at the dotted line as illustrated in FIG. 2(*b*), is the same as the operation when the movable unit (U) is at the solid line.

When the moving position of the movable optical unit (U) is at immediately below the dotted line position in FIG. 2(*b*), (the first moving position), (not illustrated, and hereinafter referred to as the 2nd moving position), the movable projection means (2) projects by its main light over the linear area crossing immediately below the utmost upper end (the 1st linear area) of of the linear area of the optical pattern (4), (not illustrated, and hereinafter referred to as the 2nd linear area). At the same time the environmental ambient light also projects its light over there.

The main projected light is reflectively scattered at the 2nd linear area on the optical pattern (4) and a part of the reflected light moves forward inside the housing (1) and the movable optic unit 31 after passing through the light port of the housing (1), and then reaches onto another predetermined position of the movable reflecting mirror (7) where it will be reflectively deflected and become a re-reflected light.

This re-reflected light is imaged at the linear light condensing plane of the line image sensor 10 after passing through the re-reflected light path illustrated in FIG. 2(*b*). At that time the other reflected light than from the 2nd linear area is projected onto the reflecting mirror 7, but not onto the linear light condensing plane of the line image sensor 10. This means that the 2nd moving position of the movable optical unit (U) corresponds to the 2nd linear area.

The operation of the movable line image sensor (10) when the movable optical unit (U) is at the 2nd moving position is the same as the operation when the movable optic unit (U) is at the utmost lower end position.

The order of the moving position of the movable optical unit (U) is represented by "i" ("i"=1, 2 . . . ). The "ith" linear area of of the optical pattern 4 corresponds to the "ith" moving position of the movable optical unit (U) on a one to one basis. This means that each different moving position of the movable optical unit (U) corresponds to each different linear area. The relationship between each moving point of the movable optical unit (U) and each linear area of the optical pattern 4 always corresponds one for one.

As noted above, the movable optical unit (U) keeps a swinging movement and the movable line image sensor (10) keeps an electronic scanning toward transverse direction cyclically or intermittently. As a result a scan pattern of parallel lines may be made on the optical pattern 4 in approximately equal value for the following reason. When the moving position of the movable optical unit (U) is at the utmost upper position, i.e. at the first moving position, the reflected light only from the utmost upper linear area (the dotted line), i.e., the first linear area, of the optical pattern 4 is projected onto the light condensing plane of the line image sensor 10 through the movable reflective mirror 7. At that time, when the cycle of convertion-store-scan (read) on the movable line image sensor (10) is started on, the distribution strength of transverse direction of the reached reflected light is converted to an electric strength signal on the time axis. Therefore, the 1st linear area may be identified in an equal value as the 1st scan line.

When the moving position of the movable optical unit (U) is immediately below the utmost upper position, i.e., the 2nd moving position, the reflected light only from the linear area (not illustrated) immediately below the utmost upper linear area (the dotted line) of the optical pattern (4) reaches onto the movable line image sensor (10) through the movable reflective mirror (7). At that time, when the cycle of conversion-store-scan (read) on the movable line image sensor (10) is started on, the distribution strength of transverse direction of the reached reflected light is converted to an electric strength signal on the time axis. Therefore, the 2nd linear area may be identified in an equal value as the 2nd scan line.

The 3rd scan lines, the 4th scan lines and so on to the utmost end scan lines, each consisting of parallel lines, may thus be made in aapproximately equal value. For instance, 50-line or 200-line scan lines may be made in nearly equal value. If the scan speed of the movable line image sensor (10) is accelerated furthermore, each space between the scan lines may be smaller and the resolution in the vertical direction may be increased without reducing the speed of the swing movement of the movable optical unit (U).

If the number of pixels of the line image sensor is increased furthermore, the resolution of transverse direction may be increased. If the vertical width (height) of pixel is reduced, the resolution of vertical direction may be increased. In this invention a sufficient space between the highest end scan lines and the lowest end scan lines may be made. Therefore, the optical pattern reading apparatus in this invention can easily read out one-dimensional row barcodes but also such 2-dimensional information patterns as a multi-row barcode, 2-dimensional barcode, letters and characters or a combination thereof.

The output signal from the signal processing part, as noted above, is a 2-element signal (binary signal). This 2-element signal is stored in the next frame memory. It is preferred that "n" (for instance 2,048 pieces) pieces of the 2-element signal row obtained by electronic scanning over "i" linear area be stored in the "i" range of the frame memory range.

The scanning can be commenced from anywhere, but it is needed to clarify from which linear area the scanning was commenced. In the decode part one-row barcode, multi-row barcode, 2-dimensional barcode, letters and character are decoded for identification by a micro computer storing identification algorithms, extracting algorithms, etc. By some chance when the initial reading is not successful, repeated readings are required until a successful read is obtained. The time required for one reading operation in the 1st embodiment is approx. 200 ms. Along with improvement of line image sensor (CCD) it may be shortened to less than 40 ms.

In the embodiment shown in FIGS. 2a and 2b a rotational type of electric-mechanical conversion system is used for driving the movable optical unit. In the embodiment shown in FIGS. 3a and 3b, a straight model (linear type) electric-mechanical system is used. The straight model electric-mechanical conversion system is known such as a movable iron-core model electric-mechanical convertor comprising a movable iron-core and a fixed line-ring, or a fixed iron-core and a movable line-ring.

Figure 3A:
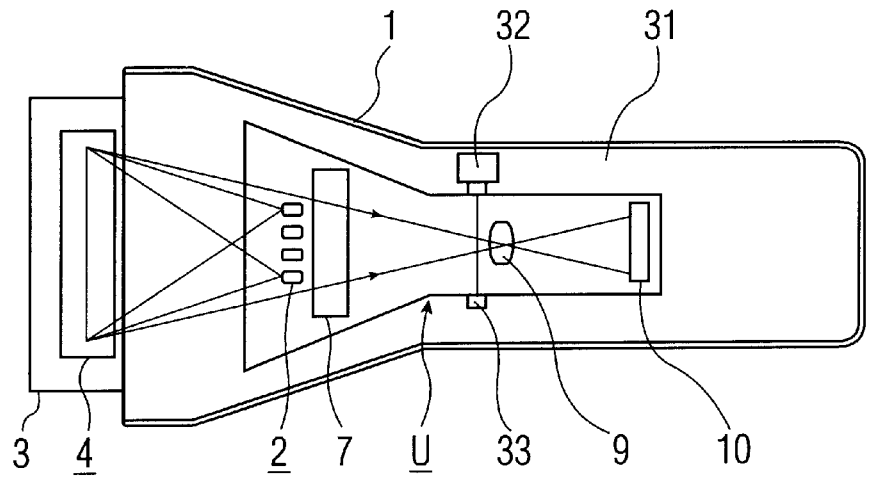
FIG. 3A is a cut away top view of another optical reader embodying the invention.
Figure 3B:
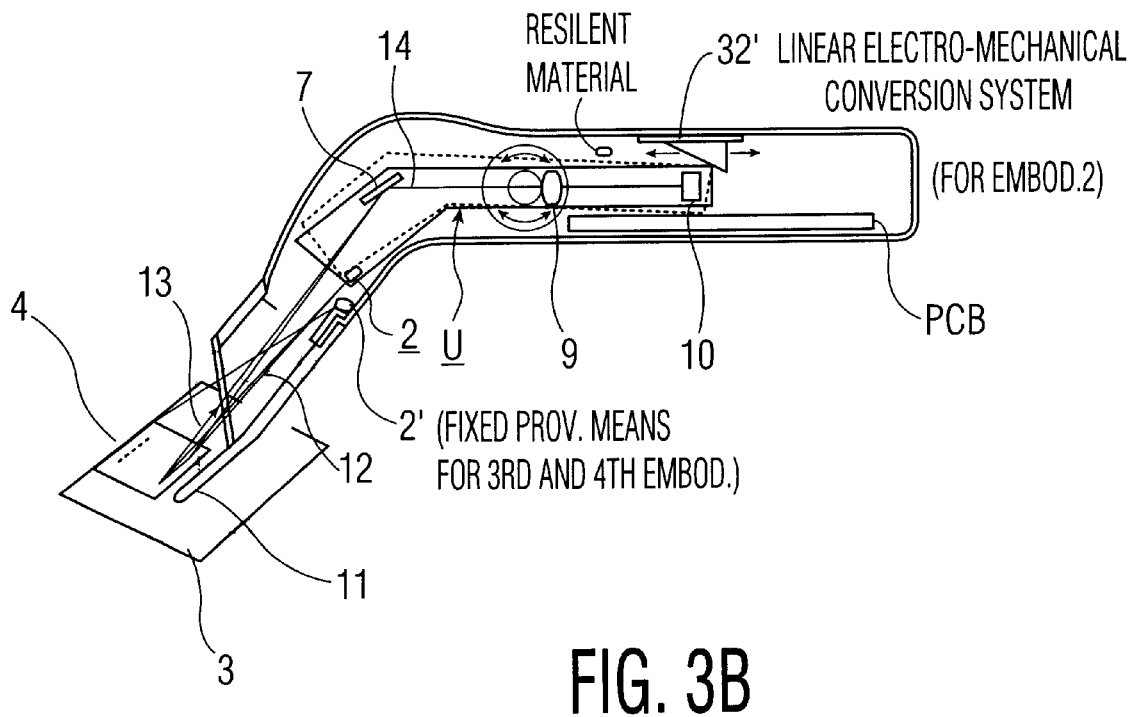
FIG. 3B is a cross sectional view of the optical reader of FIG. 3A.

In the 2nd embodiment shown in FIGS. 3a and 3b, the straight model electric-mechanical convertion system is arranged between a suitable area on the movable unit case (31) and a suitable area on the bottom wall or the top wall of the housing (1). But, these areas must be considerably in the front or rear away from the optical unit revolution shaft 33. A resilient material, compressible and extendable, such as a compressible and pulling coil spring, is arranged between the mowable unit case (31) and the bottom wall of the housing (1) and/or between the movable unit case (31) and the top wall of the housing (1) in order to cushion the swing movement of the movable optical unit (U). But, the area on the movable unit case 31 where the resilient material is arranged must be considerably in front or rear away from the optical unit revolution shaft (33). In FIGS. 3a and 3b, the driving means for the optical unit in the 2nd embodiment is simplified.

All other operations are same as for the embodiment of FIGS. 2a and 2b.

Optical readers embodying the invention may take the form of a 3rd and 4th embodiment in which the light projection means (2) of the movable optical unit (U) of the first embodiment is replaced with a fixed light projection means comprising a plurality of light sources located on the housing at a suitable place between the housing (1) and the opening of the movable optic unit 31. In such an embodiment, the movable optical unit 31 is comprised of the reflective mirror (7), the light condensing optic (9) and the line image sensor (10), and is not equipped with the light projection means (2). The projected area in a moment in the 3rd and 4th embodiment is required to be wider. In that stead a drastic effect of the light projection as the Ist and 2nd embodiment cannot be obtained. All others are same as the Ist and 2nd embodiment.

The shaft 33 is preferably placed at the center of gravity of the movable or rotable optical unit to ensure easiest movement.

We claim:

1. An optical pattern reading apparatus comprising:
   a housing (1) containing a movable optical unit (U), a signal processing part, a memory and decode part, and an optical unit drive means;
   said housing (1) having a light entrance-exit port in the front;
   said movable optical unit (U) comprising a unit case (31) which is rotatable by means of a unit revolution shaft (33), said unit case containing a projection means (2), a light reflective mirror (7), a light collecting optics (9) and a line image sensor (10);
   said unit case (31) having an opening in the front through which light can be projected and reflected light can be received;
   said light projection means (2) including a light source located inside the unit case (31);
   said light reflective mirror (7) being located inside said unit case (31) for receiving reflected light as a result of the light projection means illuminating a pattern;
   said light collecting optics (9) being located inside said unit case (31) for imaging light reflected from said reflective mirror (7) inside said unit case (31) and onto said line image sensor;
   said line image sensor (10) being disposed inside said unit case (31) for photo-electrically converting the imaged reflected light into an electric signal;
   said unit revolution shaft (33) being fixedly disposed at, or near, the center of gravity of said movable optical unit (U) along its transverse direction;
   said optical unit drive means being coupled to said movable optical unit (U) for causing it to undergo a cyclic swing movement within the vertical plane; and
   said signal processing part being electrically coupled to said line image sensor (10) for repeatedly reading out the contents of the line image sensor (10) and supplying the information read out to the memory and decode part while the movable optical unit (U) undergoes cyclic swing movement for generating a parallel-line type scan pattern, with each parallel line covering approximately equal increments of the image of the pattern (3) being read.

2. An optical pattern reading apparatus as claimed in claim 1 wherein said optical pattern reading apparatus has a hand-grip portion in the rear of the housing (1).

3. An optical pattern reading apparatus as claimed in claim 1 wherein a location guide (11) is arranged at the top end of the housing (1) for enabling light to be projected accurately and securely over an optical pattern to be read and also to have a parallel line type scan pattern over said object to be read made securely in approximately equal increments.

4. An optical pattern reading apparatus as claimed in claim 1 wherein said optical unit drive means is comprised of a driving shaft providing a swing movement by a revolution type electro-mechanical conversion system, and its driving shaft is connected to said unit revolution shaft (33).

5. An optical pattern reading apparatus as claimed in claim 1 herein said optical unit drive means is comprised of a driving part providing a linear movement by a linear type electro-mechanical conversion system, and its driving part is connected to a part away from said movable unit revolution shaft (33) on said unit case (31).

6. An optical reading apparatus as claimed in claim 1 wherein said housing is generally L-shaped with a front portion extending downward about a bending point, at an obtuse angle, relative to a rear portion, with the front portion being flat and wider relative to the rear portion, and the rear portion being rectangular and tubular;

wherein said case unit fits inside the housing and has a front and rear portion whose shape conforms to the shape of the housing; and wherein said movable reflective mirror is located near the bending point and slantingly in a downward direction.

7. An optical pattern reading apparatus comprising:

a housing (1) containing a fixed light projection means, a movable optical unit, a signal processing part, a memory and decode part, and an optical unit driving means;

said housing (1) having a light entrance-exit port in the front;

said movable optical unit comprising a unit case (31), a unit revolution shaft (33), a reflective mirror (7), light collecting optics (9) and a line image sensor (10);

said unit case (31) having an opening in the front through reflected light can be received;

said fixed light projection means comprising a light source located between the light entrance-exit port of said housing (1) and the opening of said unit case;

said reflective mirror (7) being located inside said unit case (31);

said light collecting optics (9) being located inside said unit case (31) for imaging light reflected light from said reflective mirror (7) inside said unit case (31) and onto said line image sensor;

said line image sensor (10) being located inside said movable unit case (31) for photo-electrically converting the imaged reflected light into an electric signal;

said unit revolution shaft (33) being fixedly disposed at, or near, the center of gravity of said movable optical unit along the transverse direction;

said optical unit drive means being coupled to said movable optical unit to cause it to undergo a cyclic swing movement within the vertical plane;

said signal processing part being electrically coupled to said line image sensor (10) for repeatedly reading out the contents of the line image sensor (10) and supplying the information to the memory and decode part while the movable optical unit undergoes a cyclic swing movement.

8. An optical pattern reading apparatus as claimed in claim 7 wherein said optical pattern reading apparatus has a hand-grip portion in the rear of the housing (1).

9. An optical pattern reading apparatus as claimed in claim 7 wherein a location guide (11) is arranged at the top end of the housing (1) for enabling light to be projected accurately and securely over an optical pattern to be read and also to have a parallel line type scan pattern over said object to be read made securely in approximately equal increments.

10. An optical pattern reading apparatus as claimed in claim 7 wherein said light source is arranged so as not to interfere with a reflected light path projecting light onto said line image sensor (10).

11. An optical pattern reading apparatus as claimed in claim 7 wherein said optical unit drive means is comprised of a driving shaft providing a swing movement by a revolution type electro-mechanical conversion system, and its driving shaft is connected to said unit revolution shaft (33).

12. An optical pattern reading apparatus as claimed in claim 7 wherein said optical unit drive means is comprised of a driving part providing a linear movement by a linear type electro-mechanical conversion system, and its driving part is connected to a part away from said movable unit revolution shaft (33) on said unit case (31).

13. An optical reading apparatus as claimed in claim 7 wherein said housing is generally L-shaped with a front portion extending downward about a bending point, at an obtuse angle, relative to a rear portion, with the front portion being flat and wider relative to the rear portion, and the rear portion being rectangular and tubular;

wherein said case unit fits inside the housing and has a front and rear portion whose shape conforms to the shape of the housing; and wherein said movable reflective mirror is located near the bending point and slantingly in a downward direction.

14. An optical reading apparatus comprising:

a housing having an input/output port for allowing light to be projected from within the housing onto an optical pattern to be read and for enabling light reflected from the optical pattern to pass through and into the housing;

a rotatable light projection means located within the housing including a light source for projecting a line of light externally to the housing and means for causing the line of light to be swept across an entire optical pattern area located externally to the housing;

a linear, one dimensional image sensor circuit mounted within the housing; and reflected light-receiving means located within the housing for receiving light reflected from the optical pattern area and for projecting the reflected light onto said image sensor, said reflected light receiving means for projecting onto said image sensor lines of light reflected from the optical pattern area for eventually reading the contents of the entire optical area one line at a time wherein said rotatable light projection means includes a movable unit case including a projection means, a reflective mirror, light condensing optics, and said image sensor.

15. An optical reading apparatus as claimed in claim 14, wherein said one dimensional image sensor is a solid sate sensor.

16. An optical reading apparatus as claimed in claim 15, wherein said solid state sensor is a charge coupled device (CCD) having all its elements formed along one row.

17. An optical reader apparatus as claimed in claim 14 wherein said one dimensional image sensor circuit includes a linear sensor with signal processing circuitry connected to an output of the linear image sensor and memory and decode circuitry connected to the signal processing circuitry for rapidly reading out the contents of the linear image sensor and storing the contents into said memory for further processing via said decode circuitry.

* * * * *